No. 639,095. Patented Dec. 12, 1899.
S. A. ROSEMAN.
BRAKE LEVER.
(Application filed May 9, 1899.)

(No Model.)

Witnesses
T. L. Mockabee
Henry E. Cooper

Inventor
Samuel A. Roseman
By L. Deane & Son
Attorneys

THE NORRIS PETERS CO., PHOTO-LITHO., WASHINGTON, D. C.

UNITED STATES PATENT OFFICE.

SAMUEL A. ROSEMAN, OF LAUREL, PENNSYLVANIA.

BRAKE-LEVER.

SPECIFICATION forming part of Letters Patent No. 639,095, dated December 12, 1899.

Application filed May 9, 1899. Serial No. 716,108. (No model.)

*To all whom it may concern:*

Be it known that I, SAMUEL A. ROSEMAN, a citizen of the United States, residing at Laurel, in the county of York and State of Pennsylvania, have invented certain new and useful Improvements in Brake-Levers, of which the following is a specification, reference being had therein to the accompanying drawings.

My invention relates to brake mechanism designed for use in connection with street-cars, wagons, or other vehicles; and it is designed as an improvement on the device disclosed in Letters Patent No. 617,995, granted to me under date of January 17, 1899.

The construction of the improved brake mechanism will be fully described hereinafter and defined in the appended claims, in connection with the accompanying drawings, in which—

Figure 1:
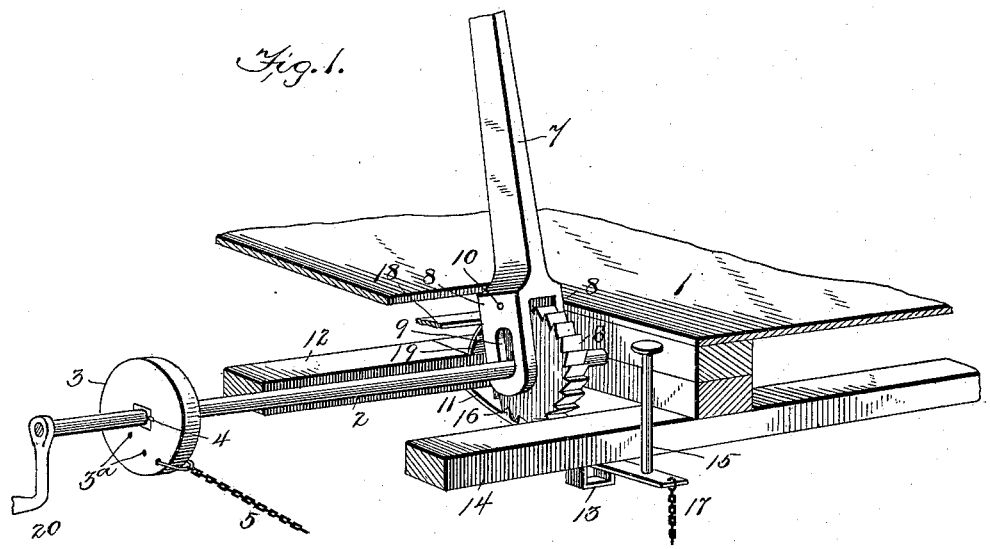
Figure 2:
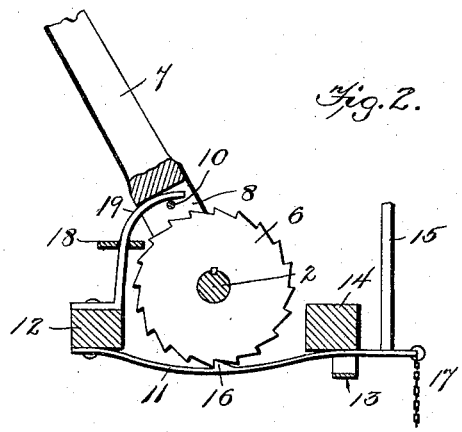
Figure 3:
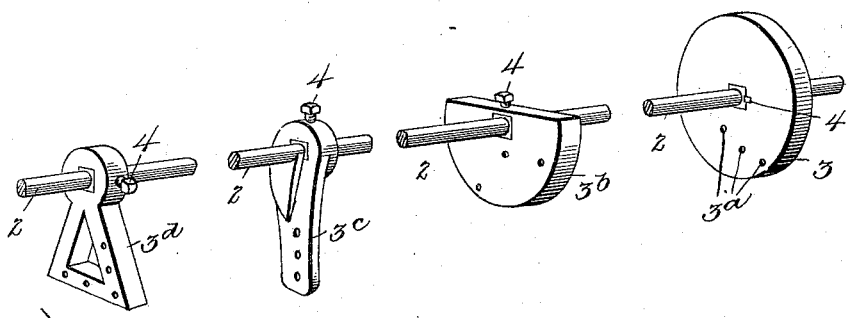

Figure 1 is a perspective view of a brake-lever and connections embodying my invention. Fig. 2 is a vertical sectional view of the same, and Fig. 3 illustrates modified forms of the slack-gathering device.

The reference-numeral 1 designates a portion of the platform of a car, and 2 a transverse rock-shaft journaled thereto. Upon the shaft 2 is fixed a wheel 3, having transverse holes $3^a$, the shaft being squared at the point of attachment of the wheel and a pin or key 4 being employed to secure the wheel.

5 designates a chain one end of which is secured in one of the openings of the wheel 3, while the other end is connected to the brake-levers (not shown) which operate the brake-bar carrying the brake-shoes.

Secured to the shaft 2 is a ratchet-wheel 6, firmly fixed to the shaft, so that the latter will be rotated by the movement of the ratchet-wheel.

The numeral 7 designates the brake-lever, the lower end of which is bifurcated, forming two arms 8, provided with elongated slots 9, through which the rock-shaft loosely passes, enabling the lever to have a limited longitudinal movement. Secured to the arms 8 is a transverse pin 10, adapted to engage with the teeth of the ratchet-wheel 6 to rotate the same when the lever is operated.

Below the ratchet-wheel 6 is arranged a spring-plate 11, one end of which is secured to one of the timbers 12 of the car, while its opposite end extends through a keeper 13, depending from the timber 14, and is provided with an upwardly-extending foot-piece 15. The plate 11 is provided with a dog 16, which is adapted to engage one of the teeth of the ratchet-wheel 6 to hold the wheel against back movement. In addition to the treadle 15 I provide the plate 11 with a chain 17, so that the plate may be operated by hand if desired.

The numeral 18 designates a bar secured to the car-frame, having an opening through which projects an upwardly-extending curved arm 19, the free end of which is adapted to engage between the lower end of the lever and the pin 10 to lift the lever, thereby disengaging its pin 10 from the ratchet-wheel.

The bar 18 serves as a guide to steady and reinforce the curved arm 19 and prevent its lateral displacement.

The rock-shaft may be provided at one end with a crank 20, if desired, so that it may be operated from the side of the car.

The operation is as follows: When it is desired to set the brakes, the lever 7 is thrown backward, thus drawing the chain 5, secured to the wheel 3, which takes up the slack in the chain and causes the brake-shoes to contact with the wheels and the dog 16 to engage the ratchet-wheel to lock the lever. If one movement is not sufficient to set the brakes, the lever can be moved forward and again pulled back as often as may be found necessary. The brakes are released by either pressing upon the treadle secured to the spring-plate or pulling upon the chain 17, when the tension of the brake connections will unwind the chain and throw the lever forward, or the lever may be thrown forward by hand when released.

In Fig. 3 I have shown four different forms of slack-gatherer—the wheel 3, (shown in Fig. 1,) a semicircular block $3^b$, an arm $3^c$, and a triangular frame $3^d$. Any one of these four devices might be employed, the same being fixed to the shaft 2 and formed with openings to permit of different adjustments of the chain 5 to take up slack.

It will be obvious that the spring-plate and dog afford a much more direct means of locking and unlocking the lever than the mechanism for that purpose shown in my Letters Patent above referred to.

I claim—

1. The combination with a rock-shaft, and a ratchet-wheel fixed thereon, of a lever having arms formed with elongated slots; a transverse pin secured to said arms; a curved arm extending above said pin; a spring-plate below said ratchet-wheel provided with a dog; means for depressing said plate; a slack-gatherer fixed upon the rock-shaft; and a brake-chain secured at one end to the slack-gatherer.

2. The combination with a rock-shaft, and the ratchet-wheel secured thereon, of the lever having arms formed with elongated slots, the transverse pin secured to said arms, the curved arm extending above said transverse pin, and a spring-plate below said ratchet-wheel, provided with a dog, one end of said spring-plate being secured to the car-frame, while its free end extends through a keeper and is provided with means for depressing said spring-plate.

In testimony whereof I affix my signature in presence of two witnesses.

SAMUEL A. ROSEMAN.

Witnesses:
T. E. BROOKS,
C. W. MOODY.